Figure 1:
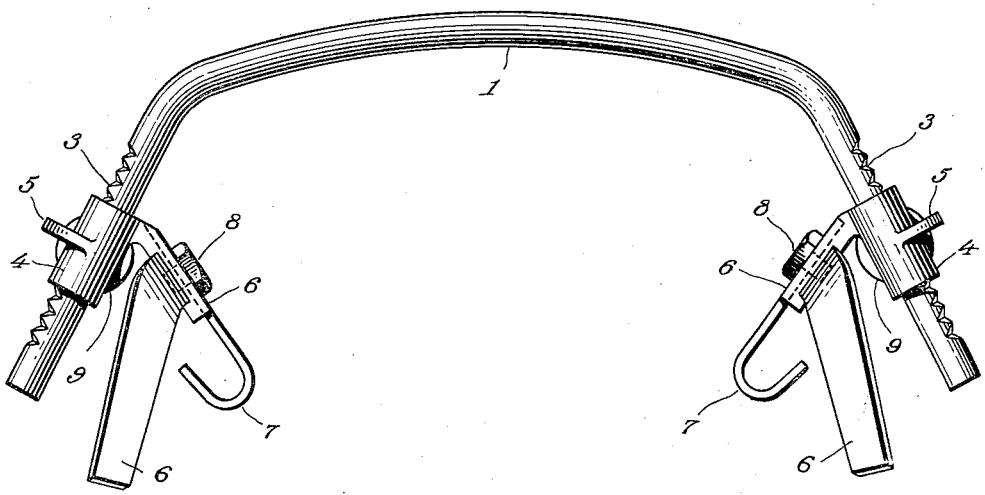
Figure 2:
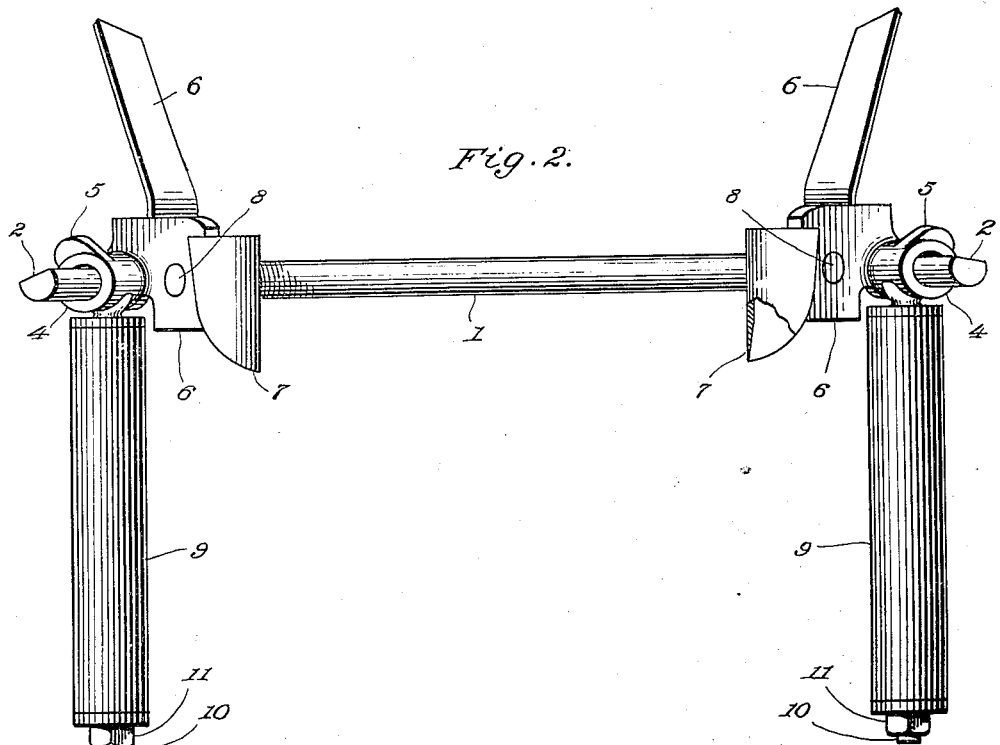

May 7, 1935.  T. N. BUSCH  2,000,375
TURPENTINE FACE SCRIBE
Filed Feb. 9, 1935  2 Sheets-Sheet 2
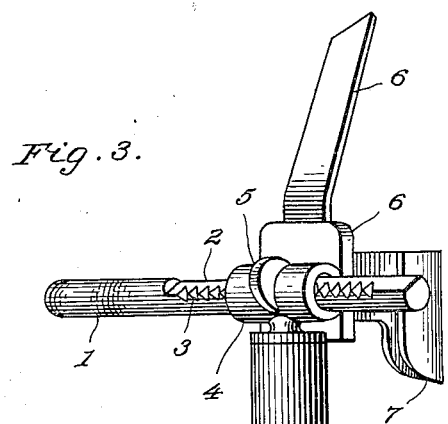
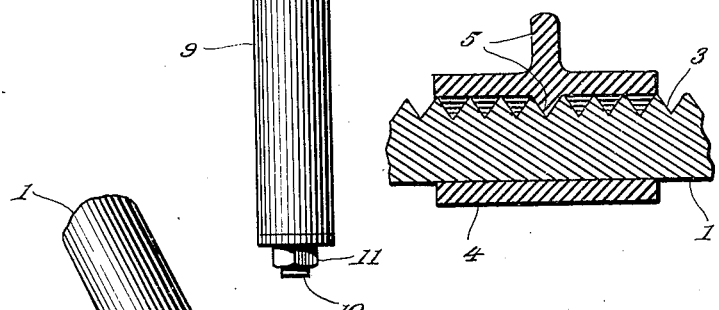
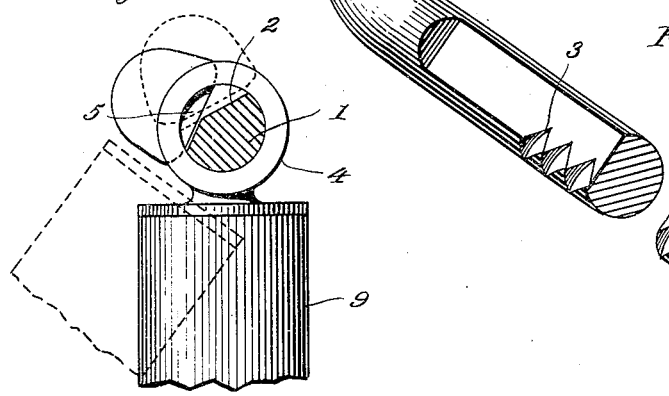
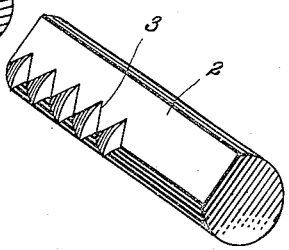

Patented May 7, 1935

2,000,375

UNITED STATES PATENT OFFICE 2,000,375

TURPENTINE-FACE SCRIBE

Thomas N. Busch, Lake City, Fla., dedicated to the free use of the Public

Application February 9, 1935, Serial No. 5,800

1 Claim. (Cl. 33—41)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the public, to take effect upon the granting of a patent to me.

My invention relates to that class of instrument used in marking or scribing the trunks of trees that are to be worked for their resin. The purpose for which my invention is designed is to delimit the size of the face which is to be cut on the tree by woods workers.

In order to carry out the purposes of my invention, reference is to be had to the structure as shown in the accompanying drawings, forming a part of this specification, in which similar numerals refer to similar parts throughout the several views.

Figure I is a plan view of my device.

Figure II is a front view.

Figure III is a side view.

Figure IV is a detailed view of handle socket showing movement on frame.

Figure V is a detailed view of indentures on frame.

Figure VI is a cross section showing socket engagement with frame.

My invention comprises a frame 1 with obliquely disposed ends, having a flattened portion 2 and a series of equally disposed indentures 3; a socket 4, having a pawl 5 disposed to engage and disengage indentures 3 to permit the socket 4 to become secured at predetermined positions on frame 1. Guides 6 are mounted on socket 4; cutting blades 7 are secured to guides 6 by means of bolt and nut 8. Handles 9, having bolts 10, and carrying nuts 11 are secured to socket 4 opposite guides 6.

In the operation of my device and for example, when the tree is measured in the 9″ to 13″ diameter range, the handles 9 are then set at right angles to the frame 1, automatically setting the cutting blades 7 to scribe the limits of a face on that particular tree which is one-third of its circumference. Any tree having a greater diameter, breast height, than 13″ is allowed the same width of face as the 13″ diameter tree, regardless of its greater diameter.

My device is of positively rigid construction, is easily adjusted and enables one to scribe between 75 to 100 trees per hour.

The cutting blades 7 and angles of the frame 1 compensate for bark thickness and is calculated to mark one-third the circumference of the tree inside the bark by setting my device to measurements on the outside of the bark. These calculations are made on the assumption that the tree has a cylindrical bole and, from past experience, is close enough for all practical purposes under actual working conditions in the field.

Having thus described my invention, I claim as new and desire to secure by Letters Patent:

In a turpentine-face scribe, of the character described, comprising a frame, having obliquely disposed end portions; a flattened portion on each end portion and a series of equally disposed indentures formed on the edges of said flattened portions; sockets carried by said frame; means on said sockets for engaging and disengaging the indentures on said frame; guides mounted on said sockets; cutting blades secured to said guides, and handles secured to said sockets.

THOMAS N. BUSCH.